Patented Aug. 12, 1930

1,772,952

UNITED STATES PATENT OFFICE

GEORG KNOTH, OF HAMBURG, GERMANY

MANUFACTURE OF SOLDERING PASTES

No Drawing. Application filed March 29, 1929, Serial No. 351,133, and in Germany April 3, 1928.

My invention relates to improvements in the manufacture of soldering pastes.

Almost all of the materials hitherto employed or suggested for soldering purposes are objectionable for the reason that they give rise to the generation of free organic or mineral acids, which corrode the metal and weaken the soldered joint.

The object of my invention is the production of a soft-soldering paste, which will assist in producing an efficient and reliable soldering joint and which may readily be applied in a variety of different ways, and which will not possess the objectionable properties of the known soldering materials.

I have discovered that this result can be satisfactorily obtained by using certain organic nitrogen compounds such as amines and the derivatives and homologues thereof, in connection with tin-solder and preferably mixed with an appropriate binder or vehicle such as vaseline or the like. In practice I have found that a comparatively small proportion of amines and the like will act to readily and perfectly clean the surfaces and to reduce the melting point of the tin solder, so that substances such as amines and the derivatives and homologues thereof are to be regarded as excellent fluxes for soft-soldering purposes.

As an example of carrying out my invention I mix 40 parts by weight of powdered tin solder with 8 parts by weight of vaseline and 1 part by weight of hexamethylentetramin to form a homogeneous paste.

In lieu of hexamethylentetramin any other organic compound of the indicated class such as aldehyde-ammonia, anilin, phenylendiamin may be employed.

Instead of using powdered tin-solder the paste may be used as a filling in a tin-tube. It goes without mentioning that the described new tin solder both in the form of a paste and in the form of a tubular solder, is applicable for soldering operations either with the aid of a blow-lamp or with the aid of a soldering iron.

What I claim is:

1. A soldering paste consisting of powdered tin solder, a flux in the form of organic amines and a suitable binder such as vaseline.

2. A soldering paste consisting of powdered tin solder, a flux in the form of derivatives of amines of the hexamethylentetramin type and a suitable binder such as vaseline.

3. A soldering paste consisting of powdered tin solder, a flux of an organic compound selected from the group consisting of aldehyde-ammonia, anilin, phenylendiamin and hexamethylentetramin and a suitable binder such as vaseline.

4. A soft-soldering paste, consisting of a mixture of pulverulent tin solder, vaseline and hexamethylentetramin, in substantially the proportions set forth.

5. A soft-soldering paste consisting of 40 parts by weight of powdered tin-solder, 8 parts by weight of vaseline and 1 part by weight of an amine such as hexamethylentetramin to form a homogeneous paste.

In testimony whereof I affix my signature.

DR. GEORG KNOTH.